United States Patent [19]

Sawasaki

[11] Patent Number: 4,761,675
[45] Date of Patent: Aug. 2, 1988

[54] NEGATIVE CARRIER ASSEMBLY FOR USE WITH A PHOTOGRAPHIC PRINTER

[75] Inventor: Takashi Sawasaki, Arida, Japan

[73] Assignee: Noritsu Kenkyu Center Co., Ltd., Wakayama, Japan

[21] Appl. No.: 90,991

[22] Filed: Aug. 31, 1987

[30] Foreign Application Priority Data

Sep. 1, 1986 [JP] Japan .................................. 61-134582

[51] Int. Cl.$^4$ ........................ G03B 27/62; G03B 27/64
[52] U.S. Cl. ........................................ 355/76; 352/226
[58] Field of Search ................ 355/75, 76; 352/221, 352/225, 226, 229, 230

[56] References Cited

U.S. PATENT DOCUMENTS

| | | | |
|---|---|---|---|
| 2,263,025 | 11/1941 | Young, Jr. et al. ................ | 355/76 |
| 4,313,677 | 2/1982 | Stewart .............................. | 355/76 |
| 4,353,645 | 10/1982 | Kogane et al. ................... | 352/225 X |
| 4,396,281 | 8/1983 | Anderson ......................... | 355/76 X |
| 4,396,282 | 8/1983 | Anderson ......................... | 355/76 |
| 4,396,283 | 8/1983 | Anderson et al. ................ | 355/76 |

FOREIGN PATENT DOCUMENTS 685196  4/1964  Canada .................................. 355/76

*Primary Examiner*—Richard A. Wintercorn
*Attorney, Agent, or Firm*—Armstrong, Nikaido, Marmelstein & Kubovcik

[57] ABSTRACT

A negative carrier assembly used with a photographic printer. It provides for quick change of the film feed direction according to the film size and other factors. When changing the negative film feed direction, the mask support plate is removed from the negative mask base, turned by 90 degrees, and re-mounted on the negative mask base. This changes the direction of a film guide groove formed in the negative mask supported on the negative mask base. The negative film is pressed by the negative presser frame mounted on the negative presser arm pivoted together with the holder arm.

1 Claim, 2 Drawing Sheets

NEGATIVE CARRIER ASSEMBLY FOR USE WITH A PHOTOGRAPHIC PRINTER

The present invention relates to a negative carrier assembly for use with a photographic printer.

When printing the negative images of a negative film on a web of color paper with a photographic printer, two steps are alternately repeated, i.e. a step of fitting a negative film into a film guide groove formed in a negative mask which is a part of a negative carrier unit and pressing the film elastically by a negative presser frame to expose the film to light and the other step of pushing the negative presser frame upwardly after exposure to release the film and advance it one frame ahead.

The negative film is fed either longitudinally or transversely according to its size or the relation between the width of a web of paper loaded in the printer and a desired print size. The direction of feed has to be changed according to such factors.

A prior art negative carrier assembly is provided with a turntable which supports a negative mask base for supporting a negative mask, a mechanism for pressing a negative film and a means for driving the pressing mechanism carrier assembly, it is necessary to support the turntable rotatably and further provide a driving means for the turntable and a mechanism for holding the turntable in its stop position. The assembly is thus very complicated in construction and is time-consuming to assemble.

It is an object of the present invention to provide a negative carrier assembly which obviates the abovesaid shortcomings, which is simple in construction and which allows an extremely easy change of direction of a film guide groove formed in a negative mask.

In accordance with the present invention, there is provided a negative carrier assembly for use with a photographic printer, comprising a negative mask base formed with a recess; a negative carrier unit having a mask support plate detachably received in the recess and formed with a recess for receiving a mask; a holder arm pivotally mounted near the recess in the negative mask base; means for driving the holder arm; a holder mounted on the holder arm at free end thereof and formed with a groove; a negative mask detachably mounted in the recess in the mask support plate and formed with a film guide groove; a negative presser arm having its rear portion pivotally supported on the mask support plate; a negative presser frame mounted on the negative presser arm at its front portion so as to be received in the film guide groove formed in the negative mask; the negative presser arm being formed with a pair of projections at its rear portion so as to be loosely engaged in the groove formed in the holder.

With the negative carrier assembly as described above, when changing the feed direction of the negative film, the mask support plate of the negative carrier unit is removed from the recess in the negative mask base, turned by 90 degrees and re-mounted in the recess so that the projection of the negative presser arm will be received in the recess in the holder.

With the projection in engagement with the groove, when the solenoid is activated to pivot the holder arm and thus pivot the negative presser arm, the negative presser frame mounted to the end of the negative presser arm will be pressed against the negative film fitted in the guide groove or released from the film.

With the present invention, the mask support plate of the negative carrier unit is adapted to be detachably received in the recess formed in the negative mask base. Thus the feed direction of the negative film can be changed very easily because the direction of the film guide groove in the negative mask supported on the mask support plate can be readily changed just by turning the mask support plate of the negative carrier unit by 90 degrees and refitting it into the recess.

Since the negative carrier assembly of this invention is of such a simple structure that the negative mask base supports the holder arm for pivoting the negative presser arm of the negative carrier unit and the solenoid for pivoting the holder arm so that the negative carrier unit can be detachably received in the recess, it is easy to assemble and is compact in size.

Other features and objects of the present invention will become apparent form the following description taken with reference to the accompanying drawings, in which.

Figure 1:
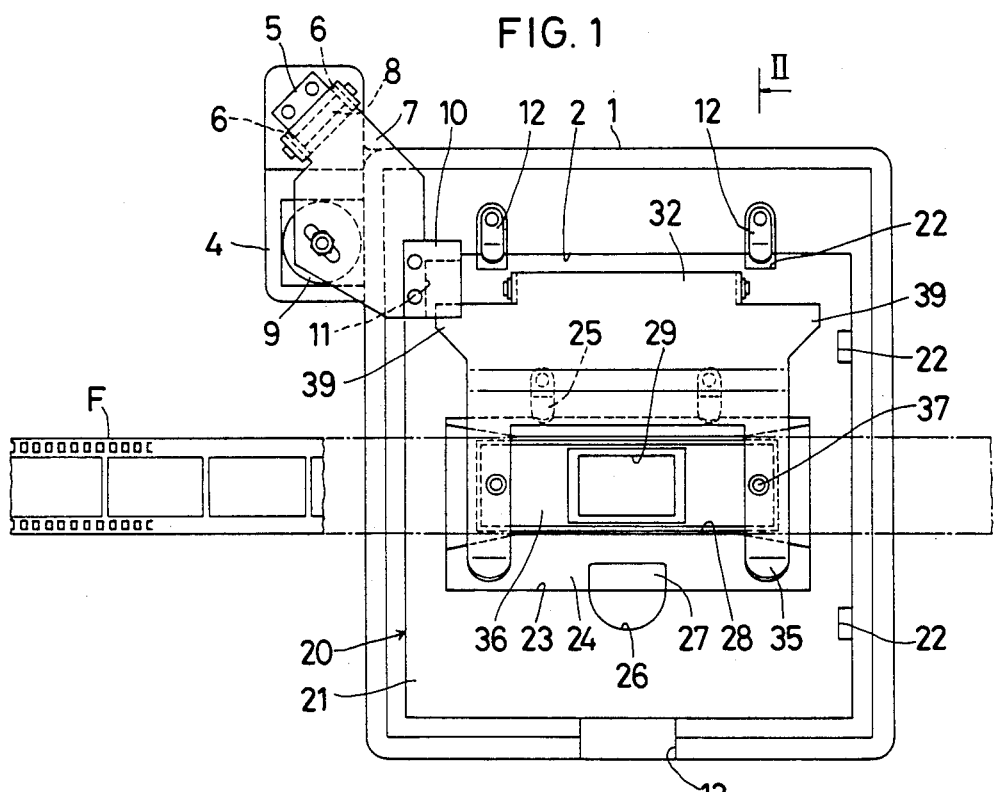
FIG. 1 is a plan view of one embodiment of the negative carrier assembly in accordance with the present invention.
Figure 2:
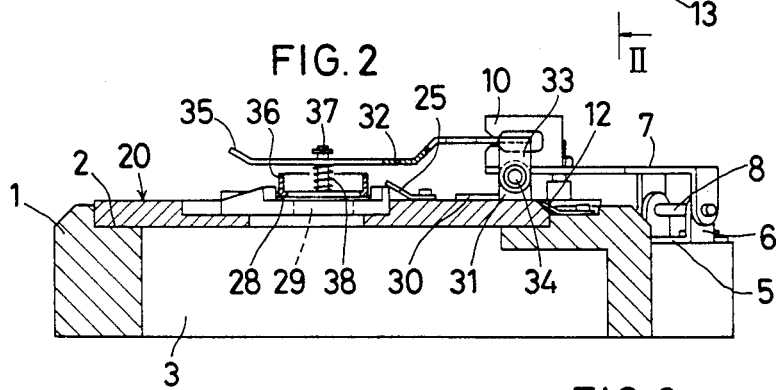
FIG. 2 is a sectional view taken along line II—II of FIG. 1.
Figure 3:
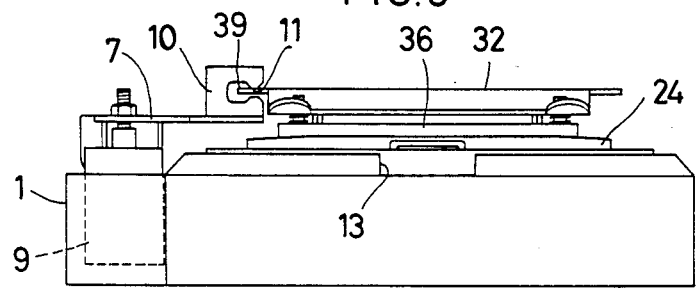
FIG. 3 is a side view of the same.
Figure 4:
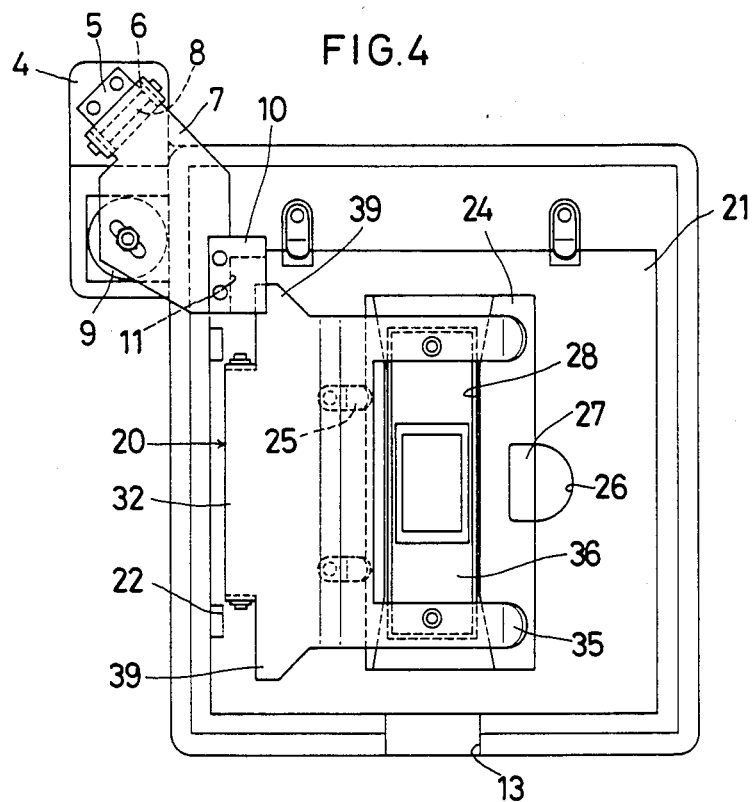
FIG. 4 is a plan view of the same with the mask support plate turned by 90 degrees from the position in FIG. 1.

Now referring to the drawings, as shown in FIGS. 1 and 3, the negative carrier assembly according to the present invention comprises a negative mask base 1 and a negative carrier unit 20 supported on the mask base 1.

The negative mask base 1 is formed in its top surface with a rectangular recess 2 and in the bottom of the recess 2 with an opening 3 for light exposure. It is also provided with a projection 4 at one side of its rear portion. On the projection 4 is mounted a support plate 5 which has a pair of support pieces 6 to pivotally support the rear end of a holder arm 7 on a pin 8. A solenoid 9 for pivoting the holder arm 7 is mounted on the projection 4.

The holder arm 7 has its front end disposed over the outer periphery of the recess 2 and a holder 10 provided at its front end is formed with a groove 11 in one side. (FIG. 3)

The negative carrier unit 20 has a mask support plate 21 adapted to be detachably received into the recess 2 formed in the negative mask base 1. The mask support plate 21 is formed with a plurality of cutouts 22 in its two neighboring sides with one square corner therebetween. The mask support plate 21 is inserted obliquely into the recess 2 from the front side of the negative mask base 1 with one side thereof formed with the cutouts 22 ahead to bring its cutouts into engagement with resilient pieces 12 provided on the negative mask base 1 at its rear top so as to keep the mask support plate 21 from slipping off. The negative mask base 1 is formed in the front edge of its top surface with a cutout 13 for inserting a fingertip communicating with the recess 2 so that the mask support plate 21 can be easily removed.

Figure 5:
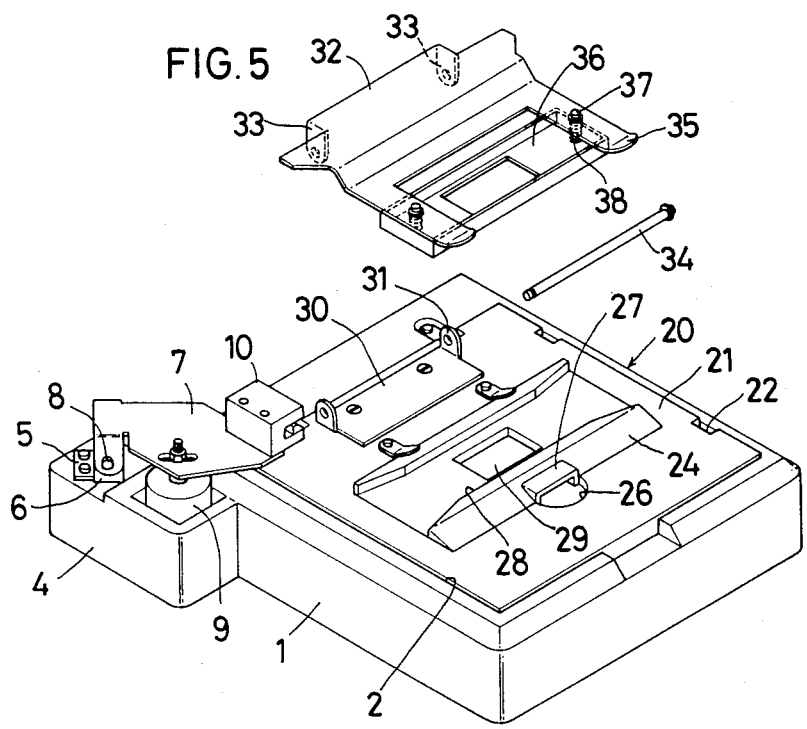
FIG. 5 is an exploded perspective view of the same.

The mask support plate 21 is formed in its top surface with a recess 23 (FIG. 5) to receive a mask. A plurality of resilient pieces 25 mounted on the mask support plate 21 are adapted to engage the rear portion of a negative mask 24 received in the recess 23 to prevent it from slipping off. (FIG. 5)

The mask support plate 21 is formed in its top surface with a cutout 26 communicating with the recess 23 to facilitate the removal of the negative mask 24 from the recess 23. The negative mask 24 is in turn formed at a position opposite to the cutout 26 with an engaging portion 27.

The negative mask 24 is formed in its top surface with a film guide groove 28 extending for the entire width thereof and formed in the bottom of the film guide groove 28 with an opening 29 for light exposure.

On the mask support plate 21 at its rear top is mounted an arm support plate 30, which is provided with a pair of support pieces 31. A negative presser arm 32 has its elbow portions 33 at its rear pivotally supported on a pin 34 mounted on the support pieces 31. The negative presser arm 32 has its tip divided into two portions 35 which are axially movably supported by a pair of pins 37 protruding from the top surface of a negative presser frame 36. The presser frame 36 is adapted to fit in the film guide groove 28 formed in the negative mask 24 and is normally biased downwardly by springs 38 mounted on the pins 37.

The negative presser arm 32 is provided at both sides of its rear portion with a pair of projections 39 adapted to be loosely received into the groove 11 formed in the holder 10. With the mask support plate 21 set in its operative position, one of the two projections 39 engages in the groove 11. The other projection 39 will get into the groove 11 when the mask support plate is turned by 90 degrees.

Several kinds of such negative carrier units 20 are prepared and one unit 20 suited to the size of the negative film F to be exposed is selected from among them and mounted on the negative mask base 1.

In operation, a negative film F is set in the film guide groove 28 in the negative mask 24 and advanced frame by frame so as to be exposed to light. A solenoid 9 is activated every time the negative film F is advanced one frame ahead.

When the solenoid 9 is activated to pivot the holder arm 7 downwardly, the projection 39 in the groove 11 in the holder 10 will be pushed downwardly, pivoting the negative presser arm 32 downwardly about the pin 34. Although the holder arm 7 pivots about an axis off the pin 34 around which the negative presser arm 32 pivots, the negative presser arm 32 can smoothly pivot downwardly owing to some play given between the groove 11 and the projection 39, so that the negative presser frame 36 elastically pushes the negative film F in the film guide groove 28.

After each frame of the nagative film F is exposed to light, the solenoid 9 is activated to swing back the holder arm 7 and the negative presser arm 32 upwardly, thus releasing the negative film F to allow it to advance one frame ahead.

The negative film F is thus fed either transversely or longitudinally according to the size of the film or the size of printing on color paper. When it is required to feed it transversely, the mask support plate 21 is fitted in the recess 2 in such a manner that the film guide groove 28 in the negative mask 24 has its both ends disposed at both sides of the negative mask base 1 as shown in FIG. 1.

If it is necessary to change the direction of the guide groove 28 to feed the negative film F longitudinally, the mask support plate 21 is disengaged from the recess 2, turned by 90 degrees and put into engagement with the recess 2. The projection 39 of the negative presser arm 32 is thus fitted in the groove 11.

What is claimed is:

1. A negative carrier assembly for use with a photographic printer, comprising: a negative mask base formed with a recess; a negative carrier unit having a mask support plate detachably received in said recess and formed with a recess for receiving a mask; a holder arm pivotally mounted near said recess in said negative mask base; means for driving said holder arm; a holder mounted on said holder arm at the free end thereof and formed with a groove; a negative mask detachably mounted in said recess in said mask support plate and formed with a film guide groove; a negative presser arm having its rear portion pivotally supported on said mask support plate; a negative presser frame mounted on said negative presser arm at its front portion so as to be received in said film guide groove formed in said negative mask; said negative presser arm being formed with a pair of projections at its rear portion so as to be loosely engaged in said groove formed in said holder.

* * * * *